May 29, 1951          J. BARTON          2,554,805

LAWN MOWER ATTACHMENT

Filed July 26, 1946          2 Sheets-Sheet 1

Inventor
James Barton
By [signature] Atty

May 29, 1951          J. BARTON          2,554,805
LAWN MOWER ATTACHMENT
Filed July 26, 1946          2 Sheets-Sheet 2
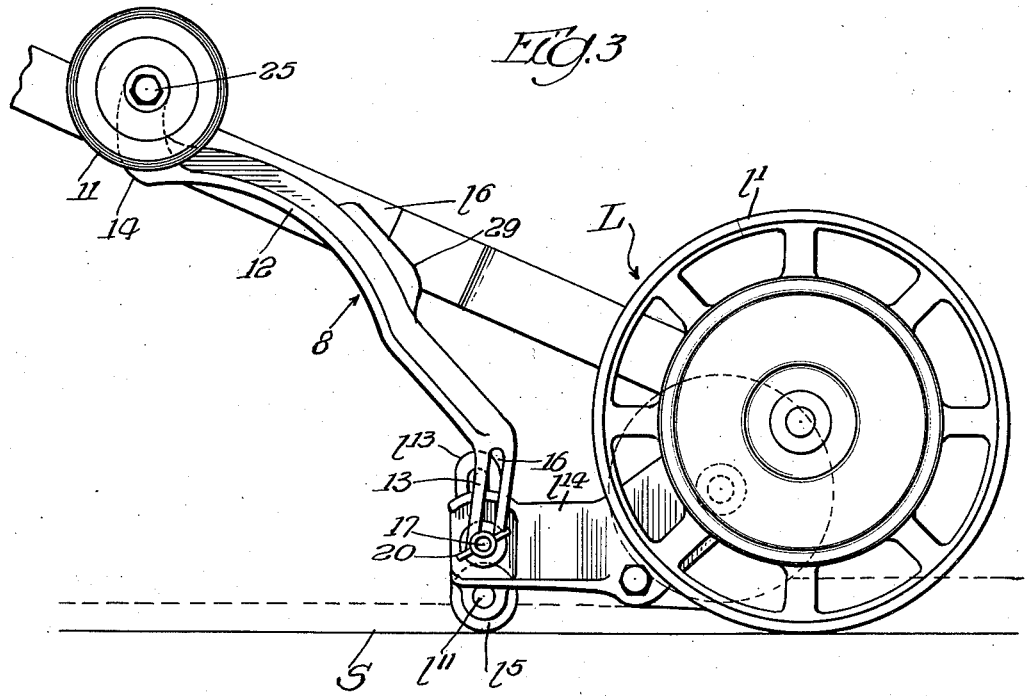
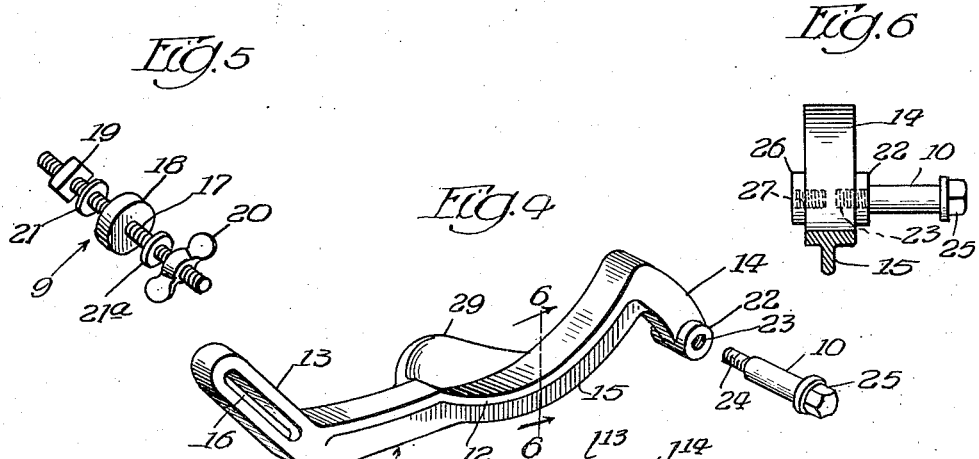
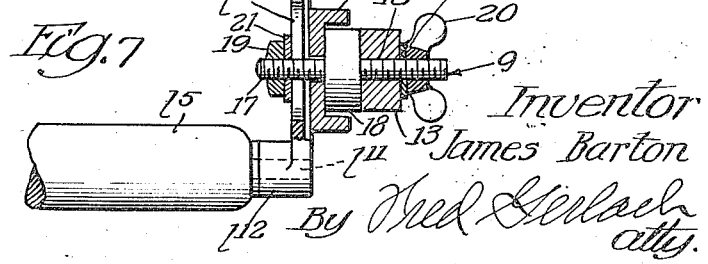
Inventor
James Barton
By Fred Gerlach
atty.

Patented May 29, 1951

2,554,805

UNITED STATES PATENT OFFICE 2,554,805

LAWN MOWER ATTACHMENT

James Barton, Chicago, Ill.

Application July 26, 1946, Serial No. 686,561

9 Claims. (Cl. 56—251)

The present invention relates generally to attachments for lawn mowers. More particularly the invention relates to that type of lawn mower attachment which is adapted in connection with use thereof and when the lawn mower to which it is applied is operated or used to cut grass that borders directly on a gutter such, for example, as the usual gutter at the outer margin of a sunken flower bed to hold the lawn mower wheel that overlies or is adjacent to the gutter in an elevated position with respect to the gutter in order that the blades of the lawn mower do not cut into and level off or destroy the sod adjacent the gutter, and as its principal components or parts comprises: (1) a mounting having means for connection or attachment to the lawn mower; and (2) an auxiliary small sized vertically extending wheel which is carried by the mounting and is adapted in connection with use of the attachment to travel in the gutter.

One object of the invention is to provide a lawn mower attachment of this type which is an improvement upon, and has certain inherent advantages over, previously designed lawn mower attachments of the same general character and is characterized by simplicity of design or construction and high efficiency.

Another object of the invention is to provide an attachment of the aforementioned type in which the mounting thereof is so constructed and designed that the attachment may be applied to lawn mowers of different makes and sizes.

Another object of the invention is to provide a lawn mower attachment of the last mentioned character in which the mounting is in the form of an elongated arm which has one end thereof pivotally connected to a part of the lawn mower frame and its other end provided with a horizontally extending stub axle for the auxiliary wheel, has the central portion thereof downwardly bowed or arched so as to receive and grip frictionally the lower portion of the adjacent lawn mower wheel when the attachment is in its operative position, and is adapted to be swung into an upstanding position when the attachment is not in use.

A further object of the invention is to provide a lawn mower attachment of the type and character last mentioned in which the pivotal connection for the arm constituting the mounting is adjustable to the end that when the attachment is in use the arm may be adjusted circumferentially with respect to the adjacent lawn mower wheel in order to vary the position of the auxiliary wheel relatively to said adjacent lawn mower wheel and thus regulate or selectively determine the elevation of the adjacent lawn mower wheel with respect to the gutter in which the auxiliary wheel travels.

A still further object of the invention is to provide a lawn mower attachment which is generally of new and improved construction and not only is simple in design but also may be produced at a comparatively low cost and applied or attached with facility.

Other objects of the invention and the various advantages and characteristics of the present lawn mower attachment will be apparent from a consideration of the following detailed description.

The invention consists in the several novel features which are hereinafter set forth and are more particularly defined by the claims at the conclusion hereof.

In the drawings which accompany and form a part of this specification or disclosure and in which like letters and numerals of reference denote corresponding parts throughout the several views:

Figure 1 is a front view of a conventional or standard lawn mower having applied thereto an attachment embodying the invention, the attachment being shown in its operative position wherein the central portion of the arm constituting the mounting is positioned in engagement and underlying relation with the bottom portion of the adjacent lawn mower wheel so that the auxiliary wheel which is carried by the distal end of the arm is positioned beneath the adjacent lawn mower wheel to the end that it serves to support the latter in an elevated position with respect to the gutter in which the auxiliary wheel travels;

Figure 2 is a side view of the lawn mower and attachment, showing the attachment in its operative position and illustrating in detail the manner in which the pivotal connection for the arm is adjustable to permit the arm to be adjusted circumferentially with the adjacent lawn mower wheel for purposes of regulating or adjusting the position of the auxiliary wheel relatively to said adjacent lawn mower wheel;

Figure 3 is a similar side view showing the attachment swung into its inoperative position so that it is out of the way when the lawn mower is used conventionally for grass cutting purposes;

Figure 4 is a perspective of the arm constituting the mounting of the attachment;

Figure 5 is a perspective of the pivot assembly constituting the pivotal connection between the proximal end of the arm and a part of the lawn mower frame;

Figure 2:
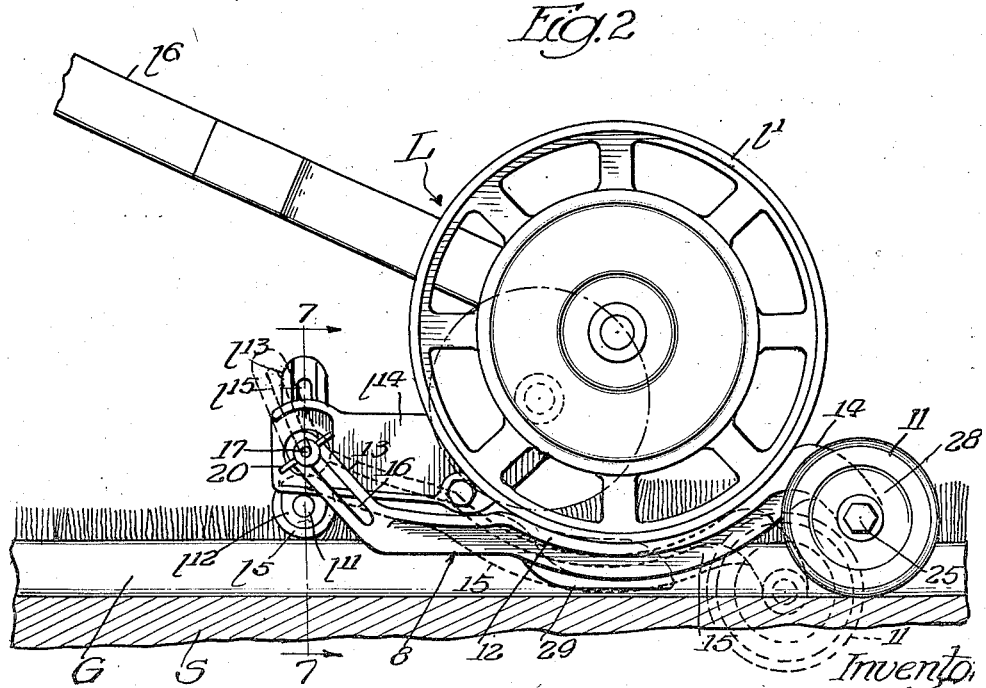

Figure 6 is a vertical transverse section taken on the line 6—6 of Figure 4 and showing the manner in which the central portion of the arm is downwardly bowed or arched in order to engage and frictionally grip the lower portion of the adjacent lawn mower wheel; and Figure 7 is a vertical transverse section taken on the line 7—7 of Figure 2 and showing in detail the manner in which the pivot assembly is applied to a part of the frame of the lawn mower to which the attachment is applied.

Figure 1:
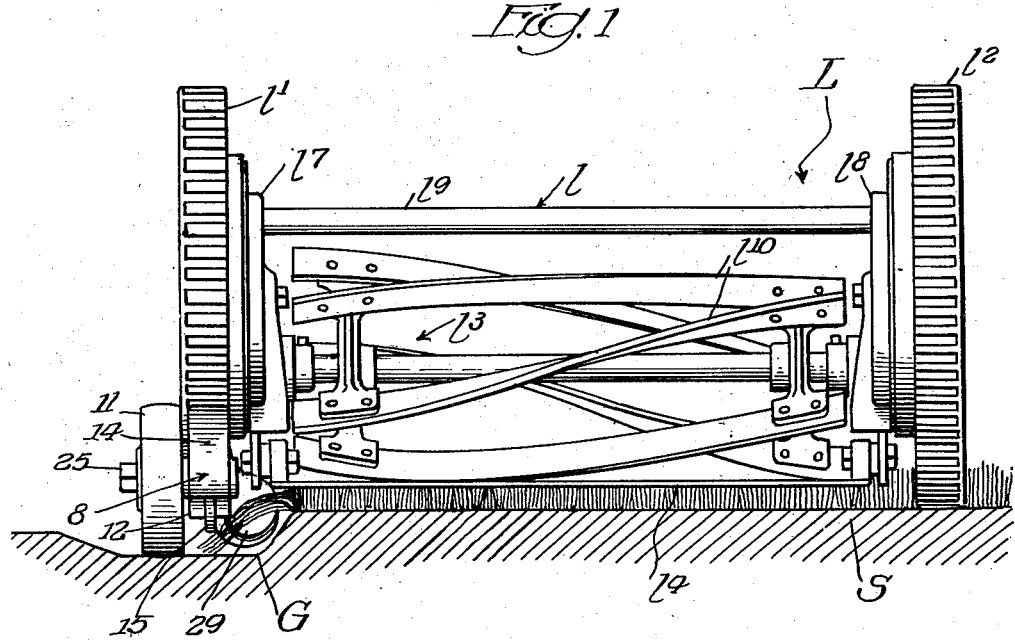

The attachment which is shown in the drawing constitutes the preferred form or embodiment of the invention. It is illustrated in connection with a lawn mower L and is adapted in connection with use thereof and when the lawn mower to which it is applied is operated or used to cut grass that boarders on a gutter to hold the lawn mower wheel that overlies or is adjacent the gutter in an elevated position with respect to the gutter in order that the blades of the lawn mower do not cut into and level off or destroy the sod adjacent the gutter. The lawn mower L is of conventional or standard construction and comprises an elongated frame 1, a pair of ground wheels $1^1$ and $1^2$, a rotor $1^3$, knife bar $1^4$, a roller $1^5$ and an operating shaft $1^6$. The frame 1 consists of a pair of opposed vertically extending spaced apart gear housings $1^7$ and $1^8$ and a horizontally extending crossrod $1^9$ which extends between, and has the ends thereof fixedly connected to the upper portions of, the two gear housings. The ground wheel $1^1$ is disposed outwards of and is rotatably connected to the gear housing $1^7$ and the other ground wheel, that is, the ground wheel $1^2$ is disposed outwards of and is rotatably connected to the gear housing $1^8$. The rotor $1^3$ of the lawn mower extends between, and is driven by suitable gears in, the gear housings 8 and 7 and embodies an annular series of spiral blades $1^{10}$. The blades as well understood in the art are adapted in connection with forward travel of the lawn mower to traverse the knife bar $1^4$ and effect the desired cutting of the grass. The knife bar $1^4$ extends between the rear lower portions of the gear housings $1^7$ and $1^8$ and is suitably secured in place. The roller $1^5$ extends horizontally and is disposed behind and in parallel relation with the knife bar $1^4$. The end of the roller $1^5$ that is adjacent the ground wheel $1^1$ is provided with a trunnion $1^{11}$ and this is journalled in a bearing $1^{12}$ on the lower end of a vertically extending bracket $1^{13}$. The latter fits against the inner face of, and is vertically adjustable with respect to, a rearwardly extending extension $1^{14}$ on the gear housing $1^7$. The other end of the roller $1^5$ is journalled and supported in the same manner as the end that is adjacent the ground wheel $1^1$. The operating shaft $1^6$ projects upwards and rearwards from the lawn mower frame and is provided with a forwardly extending yoke, the front ends of which are pivotally connected to certain parts of the frame 1. The rear end of the operating shaft is provided with a transversely extending handle (not shown) in order that the shaft may be gripped by the operator in connection with operation or use of the lawn mower. The lawn mower L is shown in Figures 1 and 2 of the drawings as being used to cut grass that is growing from sod S and boarders on a gutter G. The gutter G may be the usual gutter at the outer margin of a sunken flower or other bed B, as shown in Figure 1, or it may be adjacent a sidewalk (not shown). When the lawn mower L is used to cut grass, as shown in Figure 1, the ground wheel $1^1$ overlies the gutter G in order that the blades of the rotor serve to cut the grass that is directly adjacent the gutter. The attachment is shown in the drawings as being associated with the ground wheel $1^1$ and in connection with the use thereof, as shown in Figure 1, serves to hold the lawn mower ground wheel $1^1$ in an elevated position with respect to the gutter, in order that the blades of the lawn mower do not cut into and level off or destroy the corner portion of the sod S, that is, the portion of the sod that boarders on or is directly adjacent the gutter G. As its component parts the attachment comprises an arm 8, a pivot assembly 9, a stub axle 10, and an auxiliary wheel 11.

The arm 8 together with the pivot assembly 9 and the stub axle 10 constitutes a mounting for the auxiliary wheel. It is preferably in the form of a one-piece casting of aluminum or other light weight metal and comprises a central portion 12, an upwardly and rearwardly extending rear end portion 13 and a forwardly and downwardly extending front end portion 14. When the attachment is in its operative position, the arm 8 assumes the position shown in Figures 1 and 2 of the drawings. The central portion 12 of the arm is downwardly bowed or arched in order to engage and frictionally grip the lower portion of the lawn mower ground wheel $1^1$. The degree of downward bowing or arching of the central portion 12 of the arm 8 is gradual in order that the attachment as a whole may be applied to lawn mowers of different makes and sizes. By having the degree of downward bowing or arching of the central portion of the arm gradual, such portion of the arm will accommodate lawn mower wheels that vary in size. The central portion of the arm 8 is reinforced by way of a longitudinally extending depending rib 15. Preferably, the rib 15 is located or disposed midway between the side edges of the central portion 12 of the arm. The rear end portion 13 of the arm 8 is disposed outwards of and in lapped relation with the rearwardly extending extension $1^{14}$ of the gear housing $1^7$. It embodies a longitudinal slot 16 and when the attachment is in its operative position, extends upwards and rearwards (see Figure 2).

The pivot assembly 9 has a two-fold purpose in that it serves to support the arm 8 so that it may be swung back and forth between its normal or operative position and an inoperative position wherein it extends upwards as shown in Figure 3, and also adjustably to connect the bracket $1^{13}$ to the housing extension $1^{14}$. It extends transversely with respect to the arm 8 of the attachment and as its component parts comprises an elongated screw threaded pin 17, a nut 18 on the central portion of the pin, a nut 19 on the inner end of the pin, and a wing nut 20 on the outer end of the pin. The inner end of the screw threaded pin 17 extends through a circular aperture 21 in the rear end of the extension $1^{14}$ and also extends through a vertical slot $1^{15}$ in the bracket $1^{13}$ for the lawn mower roller $1^5$. The nut 18 of the pivot assembly 9 abuts against the outer face of the extension $1^{14}$ and the nut 19 is disposed adjacent the inner face of the bracket $1^{13}$. When these two nuts are tightened to their fullest extent, the screw threaded pin 17 is maintained or held in fixed or rigid relation with respect to the extension $1^{14}$. In the event it is desired vertically to adjust the bracket $1^{13}$ in connection with proper positioning of the lawn mower roller 1⁵, the nut 19 on the inner end of the pin 17 is loosened. Upon loosening of the nut 19, the bracket 1¹³ may be raised or lowered relatively to the extension 1¹⁴. If desired, a washer 21 may be mounted on the pin 17 and interposed between the nut 19 and the inner face of the bearing equipped bracket 1¹³. The outer end of the screw threaded pin 17 extends through the longitudinally extending slot 16 in the rear end portion 13 of the arm 8 and forms, with such end portion of the arm, an adjustable pivotal connection whereby the arm is permitted to swing back and forth between its operative and inoperative position, and is also permitted to be adjusted circumferentially with respect to the lawn mower wheel 1¹, in order to vary or selectively determine the position of the front end portion 14 of the arm with respect to the axis of the lawn mower wheel 1¹. The wing nut 20 on the outer end of the screw threaded pin 17 is disposed adjacent the outer side face of the rear end portion 13 of the arm 8 and is adapted, when tightened, to clamp said rear end portion of the arm against the nut 19 and thus lock the arm in its various adjusted positions. When it is desired to swing the arm 8 into its inoperative upstanding position, as shown in Figure 3, the wing nut 20 is loosened. After loosening of the nut, the arm is swung downwards and rearwards and then upwards. After swinging of the arm into its inoperative position, the wing nut 20 is tightened so as to lock the arm in place. When it is desired circumferentially to adjust the arm with respect to the lawn mower wheel 1¹, the wing nut is loosened so as to free the arm and thus permit the rear end portion 13 of the arm to be shifted relatively to the screw threaded pin 17 of the pivot assembly 9. If it is desired to lower the front end portion 14 of the arm with respect to the lawn mower wheel 1¹, the rear end portion of the arm is shifted upwards and rearwards in order to bring the outer end of the pin 17 into seated relation with the inner end of the slot 13, as shown in Figure 2. In the event that it is desired to raise the front end portion 14 of the arm 8 with respect to the lawn mower wheel 1¹, the rear end portion 13 of the arm, after loosening of the wing nut 20, is shifted downwards and forwards so as to bring the outer end of the pin 17 into seated relation with the outer end of the slot 16, as shown in full lines in Figure 3. After the desired adjustment of the arm, the wing nut 20 is tightened to its fullest extent in order to clamp or lock the arm in place. If desired, a washer 21ᵃ may be mounted on the screw threaded pin 17 and interposed between the wing nut 20 and the outer side face of the rear end portion 13 of the arm.

The stub axle 10 serves rotatably to support the auxiliary wheel 11 and is connected to and carried by the front end portion 14 of the arm 8. As best shown in Figure 4, the outer extremity of the outer end portion 14 of the arm is provided with a boss 22. The latter is formed integrally with and projects outwardly from the outer side face of the end portion 14 and embodies a centrally disposed internally threaded socket 23. The stub axle 10 extends at right angles to the arm 8 and is disposed in parallel relation with the screw threaded pin 17 of the pivot assembly 9. The inner end of the stub axle is provided with a reduced externally threaded stem 24 which fits within the internally threaded socket 23 in the boss 22 and co-acts therewith fixedly and removably to secure the stub axle to the outer extremity of the front end portion 14 of the arm 8. The outer end of the stub axle 10 is provided with a polygonal head 25 in order that the axle may be gripped by a wrench in connection with attaching it to and detaching it from the arm end portion 14. A second boss 26 is formed on the inner side face of the front end portion 14 of the arm 8. This boss is arranged in coaxial arrangement with the boss 22. It has an internally threaded socket 27 and is adapted to be utilized if it is desired to have the stub axle 10 project inwards instead of outwards relatively to the arm end portion 14.

The auxiliary wheel 11 embodies a centrally apertured hub 28 which is mounted rotatably on the stub axle 10. It is adapted, when the attachment is in its operative position and while the lawn mower is being used to cut grass as illustrated in Figure 1, to travel in the gutter G. Because of the location of the stub axle when the attachment is in its operative position, the auxiliary wheel 11 is disposed beneath the ground wheel 1¹ of the lawn mower and hence holds such wheel in an elevated position with respect to the gutter and precludes the blades of the lawn mower from cutting into and leveling off or destroying the sod S that is directly adjacent the gutter. By adjusting the arm 8 circumferentially with respect to the lawn mower ground wheel 1¹ as hereinbefore described, the auxiliary wheel may be shifted downwards or upwards relatively to said ground wheel 1¹ in order to control or selectively determine the elevation at which said ground wheel is maintained with respect to the bottom of the gutter G. If the gutter G is comparatively shallow, the arm 8 is adjusted forwards in order to raise the auxiliary wheel with respect to the lawn mower ground wheel 1¹. In the event that the gutter G is comparatively deep, the arm 8 is adjusted rearwards in order to lower the auxiliary wheel 11 relatively to the lawn mower ground wheel 1¹. It is contemplated that the arm 8 will be adjusted so that when the attachment is in use the auxiliary wheel 11 will maintain the common axis of the ground wheels in a horizontal position, as shown in Figure 1.

In addition to the parts heretofore described, the attachment comprises a downwardly and forwardly inclined deflector 29. This deflector is connected to and projects inwards from the central part of the inner side face of the central portion 12 of the arm 8 and is so arranged and designed that when the attachment is in use, it serves to direct upwards and into the path of the lawn mower blades 1¹⁰, the blades of grass which project over the gutter G. The deflector may be formed integrally with the arm 8, as shown in the drawings, or, if desired, it may be formed separately from the arm and detachably connected thereto by way of screws or similar attaching devices.

When it is desired to use the lawn mower to cut the grass that is directly adjacent the gutter G, the wing nut 20 of the pivot assembly 9 is loosened and the arm 8 is swung into its operative position wherein it is downwardly bowed or arched and the central portion 12 engages and frictionally grips the lower portion of the lawn mower ground wheel 1¹. After so swinging the arm 8, the latter is longitudinally adjusted in order to bring the auxiliary wheel 11 into the proper position with respect to the ground wheel 1¹. As soon as the arm is properly adjusted, the wing nut 20 is tightened so as to clamp or lock the arm in place. In connection with the operation of the lawn mower, the auxiliary wheel 11 as heretofore pointed out, travels in and along the gutter G and so elevates the ground wheel 1¹ with respect to the gutter that the blades of the lawn mower do not cut into and level off or destroy the portion of the sod that borders on or is contiguous to the gutter. As the auxiliary ground wheel travels along the gutter, the deflector 29 operates to deflect upwards and into the path of the blades of the lawn mower rotor, the various blades of grass that project over the gutter. When, in connection with conventional cutting of grass, it is not desired to use attachment, the wing nut 20 is first loosened and then the arm nut 8 is swung downwards and rearwards and then upwards into its inoperative position where it projects upwards. After so swinging the arm, the wing nut 20 is tightened in order to clamp or lock the arm in its inoperative position. When the attachment is in use, the lawn mower ground wheel 1¹ does not revolve or rotate because it is frictionally engaged by the central portion of the arm 8. The other ground wheel, however, does revolve and operates to drive the blade-equipped rotor.

The herein described attachment may be applied and operated with facility and is so designed and constructed that it may be produced at an extremely low cost. It effectively and efficiently fulfills its intended purpose and is characterized by the fact that it may be used in connection with lawn mowers of different makes and sizes. It is also characterized by the fact that it is capable, while attached to the lawn mower, of being swung or manipulated into an inoperative or out-of-the-way position.

The invention is not to be understood as restricted to the details set forth since these may be changed or modified within the scope of the appended claims without departing from the spirit and scope of the invention.

Having best described the invention, what I claim is new and desire to secure by Letters Patent is:

1. An attachment adapted for use in connection with a lawn mower of the type that embodies a rigid frame together with a pair of opposed ground wheels and grass cutting means, and comprising an upstanding auxiliary wheel, a rigid elongated mounting provided at one end with a horizontal axle for rotatably supporting the auxiliary wheel, a pivot connected to the other end of the mounting, provided with means for attachment to the lawn mower frame, and operative when said means is properly attached to said lawn mower frame to support the mounting so that it is capable of being swung bodily back and forth between an operative position wherein the auxiliary wheel is disposed adjacent and beneath one of the lawn mower ground wheels and an inoperative position wherein said auxiliary wheel is disposed above the one ground wheel, and releasable clamp means mounted on the pivot and operative fixedly to secure the mounting in either of said positions.

2. An attachment adapted for use in connection with a lawn mower of the type that embodies a rigid frame together with a pair of opposed ground wheels and grass cutting means, and comprising an upstanding auxiliary wheel, a rigid elongated arm having one end thereof provided with a laterally extending horizontal axle for rotatably supporting the auxiliary wheel, and a pivot connected to the other end of the arm, provided with means for attachment to the lawn mower frame, and operative when said means is properly attached to said lawn mower frame to support the arm so that it is capable of being swung bodily into and out of an operative position wherein the central portion of said arm underlies and grips frictionally the lower portion of one of the lawn mower ground wheels and the auxiliary wheel is disposed beneath the one ground wheel.

3. An attachment adapted for use in connection with a lawn mower of the type that embodies a rigid frame together with a pair of opposed ground wheels and grass cutting means, and comprising an upstanding auxiliary wheel, a rigid elongated arm having one end thereof provided with a laterally extending horizontal axle for rotatably supporting the ground wheel and its central portion downwardly bowed or arched, a pivot connected to the other end of the arm, provided with means for attachment to the lawn mower frame, and operative when said means is properly attached to said lawn mower frame to support the arm so that it is capable of being swung into and out of an operative position wherein its central portion underlies and grips frictionally the lower portion of one of the lawn mower ground wheels and the auxiliary wheel is disposed beneath said one ground wheel.

4. An attachment adapted for use in connection with a lawn mower of the type that embodies a riged frame together with a pair of opposed ground wheels and grass cutting means, and comprising an upstanding auxiliary wheel, a rigid elongated arm having one end thereof provided with a laterally extending horizontal axle for rotatably supporting the auxiliary wheel, mounted on the other end of the arm, provided with means for attachment to the lawn mower frame, and operative when said means are properly attached to said lawn mower frame to support the arm so that it is capable of being swung bodily into and out of an operative position wherein its central portion engages the bottom portion of one of the lawn mower wheels and the auxiliary wheel is disposed beneath the one ground wheel and is also capable of being adjusted circumferentially with respect to said one ground wheel in order to raise or lower the said auxiliary wheel with respect to said one ground wheel.

5. An attachment adapted for use in connection with a lawn mower of the type that embodies a rigid frame together with a pair of opposed ground wheels and grass cutting means, and comprising an upstanding auxiliary wheel, a rigid elongated arm having one end thereof provided with a laterally extending horizontal axle for rotatably supporting the auxiliary wheel, a connection located at the other end of the arm, consisting of a longitudinal slot in said other end of the arm and a horizontal pin extending transversely through the slot and provided with means for attachment to the lawn mower frame, and operative when the pin is properly connected by said means to said lawn mower frame to support the arm so that it is capable of being swung into and out of an operative position wherein its central portion underlies and engages the lower portion of one of the lawn mower wheels and the auxiliary wheel is disposed beneath the one ground wheel and is also capable of being adjusted circumferentially with respect to said one ground wheel in order to raise or lower the said auxiliary wheel with respect to said one ground wheel, and releasable clamp means associated with said connection and operative fixedly to secure the arm in its various adjusted positions.

6. An attachment adapted for use in connection with a lawn mower of the type that embodies a pair of opposed spaced apart ground wheels and a frame extending between the ground wheels and having a rearwardly extending extension adjacent one of the ground wheels, and comprising an upstanding auxiliary wheel, a rigid elongated arm adapted, when the attachment is in use, to extend substantially horizontally and in the direction of movement of the lawn mower and having its front end provided with a laterally extending horizontal axle for the auxiliary wheel and its central portion downwardly bowed or arched, a pivot connected to the other end of the arm, provided with means for attachment to the lawn mower frame, and operative when said means is properly attached to said frame to support the arm so that it may be swung into and out of an operative position wherein its central portion underlies and engages the lower portion of the one lawn mower ground wheel and the auxiliary wheel is disposed beneath said one ground wheel and releasable clamp means associated with the pivot and operative fixedly to secure the arm in its said operative position.

7. An attachment adapted for use in connection with a lawn mower of the type that embodies, in addition to grass cutting means, a pair of opposed spaced apart ground wheels and a frame extending between the ground wheels and having a rearwardly extending roller supporting extension directly inwards of one of the ground wheels, and comprising an upstanding auxiliary wheel, a rigid elongated arm adapted, when the attachment is in use, to extend substantially horizontally and in the direction of normal movement of the lawn mower and having its front end provided with a laterally extending horizontal axle for rotatably supporting the auxiliary wheel and its central portion downwardly bowed or arched, a connection located at the rear end of the arm, consisting of a longitudinal slot in said other end of the arm and a horizontal pin extending transversely through the slot and provided with means for attachment to the lawn mower frame, and operative when the pin is properly connected by said means to said lawn mower frame to support the arm so that it is capable of being swung into and out of operative position wherein its central portion underlies and engages the lower portion of the one lawn mower ground wheel and the auxiliary wheel is disposed beneath said ground wheel and is also capable of being adjusted circumferentially with respect to said one ground wheel in order to raise or lower the auxiliary wheel with respect to said one ground wheel, and releasable clamp means associated with said connection and operative fixedly to secure the arm in its various adjusted positions.

8. An attachment adapted for use in connection with a lawn mower of the type that embodies, in addition to grass cutting means, a pair of spaced apart ground wheels and a rigid frame extending between the ground wheels and having a rearwardly extending roller supporting extension directly inwards of one of the ground wheels, and comprising an upstanding auxiliary wheel, a rigid elongated arm adapted, when the attachment is in use, to extend substantially horizontally and in the direction of normal movement of the lawn mower and having its front end provided with a laterally extending horizontal axle for rotatably supporting the auxiliary wheel and its central portion downwardly bowed or arched, a connection located at the rear end of the arm, consisting of a longitudinal slot in said rear end of the arm and a horizontal pivot pin extending transversely through the slot and embodying means for attachment to said lawn mower extension, and operative to support the arm so that it is capable of being swung in a vertical plane into and out of operative position wherein its central portion underlies and engages the lower portion of the one lawn mower ground wheel and the auxiliary wheel is disposed beneath said one ground wheel and is also capable of being adjusted substantially lengthwise thereof and circumferentially with respect to said one ground wheel in order to raise or lower said auxiliary wheel relatively to said one ground wheel, and releasable clamp means associated with said connection and operative fixedly to secure the arm in its various adjusted positions.

9. An attachment adapted for use in connection with a lawn mower of the type that embodies a rigid frame together with a pair of opposed ground wheels and grass cutting means, and comprising an auxiliary ground engaging member, a rigid elongated mounting having an auxiliary ground engaging member mounted on one end thereof and its other end, a pivot connected to the other end of the mounting, provides means for attachment to the lawn mower frame, and operative when said means is attached to said frame to support the mounting so that it is capable of being swung bodily back and forth between an operative position wherein the auxiliary ground engaging member is disposed adjacent and beneath one of the lawn mower ground wheels and an inoperative position wherein said auxiliary ground engaging member is disposed above the one ground wheel, and releasable clamp means on the pivot for fixedly securing the mounting in either of said positions.

JAMES BARTON.

REFERENCES CITED

The following references are of record in the file of this patent:

UNITED STATES PATENTS

| Number | Name | Date |
|---|---|---|
| 1,006,807 | Tulane | Oct. 24, 1911 |
| 1,890,810 | Gast | Dec. 13, 1932 |
| 2,126,441 | Barnard | Aug. 9, 1938 |

FOREIGN PATENTS

| Number | Country | Date |
|---|---|---|
| 526,885 | Great Britain | Sept. 27, 1940 |